United States Patent [19]

Leonhardt et al.

[11] Patent Number: 5,583,754
[45] Date of Patent: Dec. 10, 1996

[54] METHOD AND DEVICE FOR CONFIGURING FUNCTIONAL UNITS IN A SERIAL MASTER-SLAVE ARRANGEMENT

[75] Inventors: Holger Leonhardt; Reinhard Broghammer, both of Bammental, Germany

[73] Assignee: Heidelberger Druckmaschinen AG, Heidelberg, Germany

[21] Appl. No.: 390,108

[22] Filed: Feb. 17, 1995

[30] Foreign Application Priority Data

Feb. 17, 1994 [DE] Germany .......................... 44 04 962.5

[51] Int. Cl.$^6$ .................................................. G05B 19/18
[52] U.S. Cl. ..................... 364/132; 364/DIG. 1; 364/187
[58] Field of Search ...................... 364/132–136, 364/187, DIG. 1, 200 MS File; 395/425, 379

[56] References Cited

U.S. PATENT DOCUMENTS

| | | | |
|---|---|---|---|
| 4,700,292 | 10/1987 | Campanmi | 364/132 |
| 5,034,878 | 7/1991 | Haspala et al. | |
| 5,084,636 | 1/1992 | Yoneda | |
| 5,086,384 | 2/1992 | Fukada | 364/132 |
| 5,165,026 | 11/1992 | Kusakabe | 364/187 |
| 5,255,388 | 10/1993 | McLaughlin | 364/132 |
| 5,469,503 | 11/1995 | Butensky et al. | 364/132 |

FOREIGN PATENT DOCUMENTS 0281534  9/1988  European Pat. Off. .

Primary Examiner—Roy N. Envall, Jr.
Assistant Examiner—Thomas E. Brown
Attorney, Agent, or Firm—Herbert L. Lerner; Laurence A. Greenberg

[57] ABSTRACT

A device for configuring functional units a serial master-slave arrangement, including a master unit having a digital computer and an input/output unit, a plurality of slave units each having a digital computer and two input/output units, the master unit being connected to a first slave unit, and the slave units being connected to one another in series via the in-put/output units and data-transfer lines. The device includes an electronic switch in each slave unit for blocking the transfer of data between a receiving section of the input/output unit for receiving information or signals from the direction of the master unit and a transmitting section of the input/output unit for driving information or signals in a direction towards adjacent slave units, and an electronic summing element in each of the slave units, the respective summing element having a first input connected to the respective digital computer, and a second input connected to a receiving section of the input/output unit for receiving the signals from a respective adjacent slave unit disposed more remotely from the master unit, the respective summing element having an output connected to a transmitting section of the input/output unit connected in the direction towards the master unit.

3 Claims, 4 Drawing Sheets 5,583,754

METHOD AND DEVICE FOR CONFIGURING FUNCTIONAL UNITS IN A SERIAL MASTER-SLAVE ARRANGEMENT

BACKGROUND OF THE INVENTION

Field of the Invention

The invention relates to a method and device for configuring functional units in a serial master-slave arrangement and, more particularly, for transferring information or other signals between a plurality of functional units cooperating in a master-slave configuration.

It has become known, heretofore, to connect a master unit and at least one slave unit to a common bus system in order to transfer information. For this purpose, specific circuits are provided in the master unit and the slave units for controlling the transfer of data therebetween. A disadvantage thereof is that the specific circuits are expensive.

Furthermore, it has become known heretofore to provide a master unit with a plurality of serial interfaces to which a respective intelligent slave unit equipped with a computer is connectable. For each additional slave unit to be connected to the master unit, an additional serial interface must be provided which is quite costly in material, as well as generally expensive, and increases the construction volume occupied by the master unit.

The possibility of connecting a plurality of slave units to a serial interface is restricted or limited by the performance of the line-driver components in the master unit. To equip the master unit with specific high-performance driver components likewise increases costs, because such components are not commercially available and consequently require individual development, or because only a limited number of such components are manufactured. Moreover, when a plurality of slave units are connected in parallel with a serial interface of the master unit, each slave unit has to be addressed by means of hardware elements, for example, by providing a number of switches in the slave unit which must be placed in a defined configuration. This procedure does not, however, permit similar slave units to be designed identically with respect to hardware and software, so that they are readily exchangeable, when necessary, for addressing purposes, which would ensure low manufacturing and service costs.

It has also become known, heretofore, to connect a plurality of slave units in series by means of data-transfer lines, one of the slave units located at the end of the serial arrangement being connected to a master unit. The master unit has one serial input/output unit, whereas the slave unit has two serial input/output units. With these constructions, also, the slave units are addressed by hardware elements, i.e., switches or soldering jumpers, having the aforementioned disadvantages.

SUMMARY OF THE INVENTION

It is accordingly an object of the invention to provide a method and device for configuring functional units in a serial master-slave arrangement wherein information or other signals are transferrable, which readily permits, at low cost, a linking and addressing of a plurality of slave units serially connected to a master unit.

With the foregoing and other objects in view, there is provided, in accordance with the invention, a method of configuring functional units in a serial master-slave arrangement provided for bidirectionally transferring digital data between a master unit and respective slave units, wherein an allocation is made by the master unit of a respective address to each slave unit which, when in a non-configured condition, has no individual address, which comprises the steps of:

a) transmitting a record A from the master unit to a list address, the record A causing a switch to be opened in each of the slave units, an interruption of a transfer to the neighboring slave units, and a resetting of a memory for an individual address in each of the slave units;

b) transmitting another record B from the master unit to the list address, the record B allocating an individual address, which is determined by the master unit and included in the record B, to each of the receiving slave units, if the memory for the individual address remains in its reset condition in the slave unit;

c) upon allocation of the individual address to the respective slave unit, providing an acknowledgement of the allocation from the respective slave unit by transmitting therefrom an acknowledgement record to the master unit, and closing the switch;

d) upon receipt of the acknowledgement record by the master unit, transmitting from the master unit a further record with a further individual address to the list address;

e) repeating the foregoing steps b) through d) of the method until a respective individual address has been allocated to each of the slave units; and f) if an acknowledgement record transmitted in the foregoing step c) of the method has not been received by the master unit or has been received in faulty condition, repeating the foregoing steps a) through e) of the method until the acknowledgement signal sent by each of the slave units has been correctly received by the master unit.

In accordance with another aspect of the invention, there is provided a device for configuring functional units in a serial master-slave arrangement, including a master unit having a digital computer and an input/output unit, a plurality of slave units each having a digital computer and two input/output units, the master unit being connected to a first slave unit, and the slave units being connected to one another in series via the input/output units and data-transfer lines, comprising an electronic switch in each slave unit for blocking the transfer of data between a receiving section of the input/output unit for receiving information or signals from the direction of the master unit and a transmitting section of the input/output unit for driving information or signals in a direction towards adjacent slave units, and an electronic summing element in each of the slave units, the respective summing element having a first input connected to the respective digital computer, and a second input connected to a receiving section of the input/output unit for receiving the signals from a respective adjacent slave unit disposed more remotely from the master unit, the respective summing element having an output connected to a transmitting section of the input/output unit connected in the direction towards the master unit.

In accordance with a concomitant feature of the invention, the device includes, connected between the respective summing element and the respective receiving section, a further electronic switch having a control input with a connection to the respective digital computer.

Thus, in an arrangement in which a plurality of slave units of a master-slave configuration are connected in series, the slave units are each equipped with two pairs of input/output units and a digital computer, an electronic switch being provided between a receiving unit located in a direction coming from the master unit and a neighboring or adjacent slave unit located towards the master unit but more remote therefrom, the electronic switch having a control input connected to the digital computer. Furthermore, in accordance with the invention, each slave unit is provided with an electronic signal-summing element, a first input of the electronic signal-summing element being connected to the digital computer, preferably via an interface circuit, and a second input of the electronic element being connected to a receiving section of the input/output unit receiving signals from the aforementioned neighboring slave unit which is disposed more remotely from the master unit. Due to the summing element, only the active signal of the respective digital computer or the neighboring slave unit is transmitted at the output of the slave unit in the direction of the master unit. The electronic switch and the summing element may be formed of different logic elements. For example, the switch may be an AND element, and the summing element may be an exclusive OR element.

Other features which are considered as characteristic for the invention are set forth in the appended claims.

Although the invention is illustrated and described herein as embodied in a method and device for configuring functional units in a serial master-slave arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
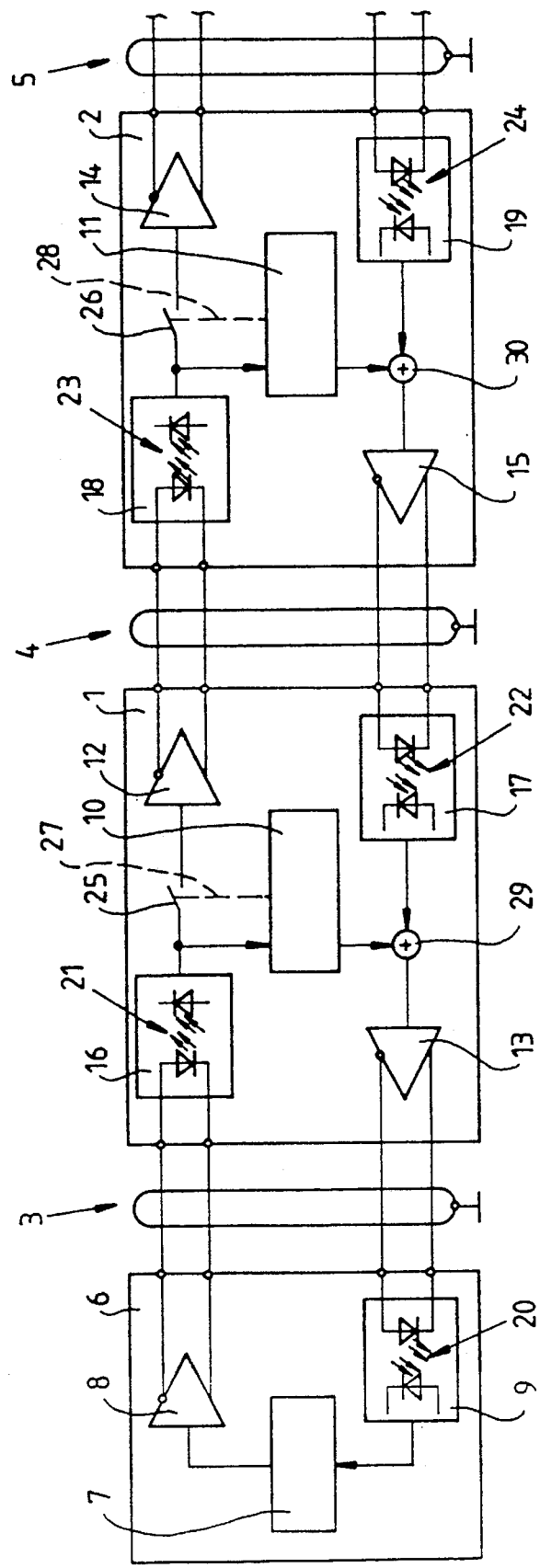
FIG. 1 is a circuit diagram of a first embodiment of the device according to the invention.

Referring now to the drawings and, first, particularly to FIG. 1 thereof, there is shown therein a plurality of similar slave units 1 and 2 connected in series by means of multicore or multi-wire cables 3, 4 and 5, the slave unit 1 located at the end of the series being connected to a master unit 6. The master unit 6 includes a digital computer 7, as well as an output unit 8 and an input unit 9, respectively, which are connected to the digital computer 7. The slave units 1 and 2, respectively, include additional digital computers 10 and 11, respectively, pairs of output units 12, 13 and 14, 15, respectively, and pairs of input units 16, 17 and 18, 19. Via the cable 3, the output unit 8 is connected to the input unit 16, and the output unit 13 is connected to the input unit 9. The cable 4 provides a connection between the output unit 12 and the input unit 18 and between the output unit 15 and the input unit 17. By means of the cable 5, the output unit 14 and the input unit 19 are connected to further non-illustrated input/output units of other slave units. To effect a galvanic separation, the input units 9, 16, 17 18, 19 are provided with optocouplers 20, 21, 22, 23, 24 having LEDs of which are connected, respectively, to two cores or wires of the cables 3, 4 and 5. The slave units 1 and 2 include electronic switches 25 and 26, respectively, for interrupting the connection between the respective input units 16 and 18 and the respective output units 12 and 14. Control inputs of the switches 25 and 26 have respective connection 27 and 28 with the respective digital computers 10 and 11. Furthermore, the slave units 1 and 2 include respective summing elements 29 and 30, having first summing inputs, respectively, which are connected to the respective digital computers 10 and 11, and second summing inputs, respectively, which are connected to respective outputs of the input units 17 and 19. The summing elements 29 and 30 also have summing outputs which are connected to respective inputs of the output units 13 and 15.

The method according to the invention may be performed with the device of FIG. 1 which is described hereinafter: Due to the series-type connection of the master unit 6 and the slave units 1 and 2, each slave unit 1, 2 has two interfaces of which each is suitable for transferring signals to and from the respective adjacent slave units 1 and 2 and to and from the master unit 6, respectively. The digital signals entering the input units 9, 16 and 18 are processed or made-ready and fed to the respective digital computers 7, 10 and 11 for evaluation. Depending upon whether the respective switch 25, 26 is closed, the digitized signals are transmitted, via the respective output unit 12, 14 of the respective slave unit 1, 2, to the following slave unit 2 connected thereto. If all of the switches 25, 26 are closed, a signal transmitted by the master unit 6 may be received by all of the slave units 1, 2 connected thereto. Conversely, a signal transmitted by any slave unit 1, 2 may be fed to the master unit 6, provided that the respective digital computer 10, 11 does not produce any signal at the summing input of the respective summing element 29, 30, so that the signal transmitted by a slave unit 1, 2 in the direction of the master unit 6 may pass in an unchanged manner the summing elements 29. 30 in the respective slave units 1, 2 located on the signal path. This may be achieved by keeping strictly to #he master-slave principle, i.e., the respective slave unit 1, 2 transmits signals only if prompted by the master unit 6 to do so. The respective digital computers 10 and 11 of the slave units 1, 2 are programmed or, in other words, the hardware thereof is designed, so that they are able to recognize a synchronizing sequence among the flow of data coming from the master unit 6 or the preceding slave unit 1 and to receive a data set. Preferably, in each data set, the synchronizing sequence is directly followed by an address byte for addressing a respective slave unit 1, 2. Via the digital computers 10, 11, all of the slave units 1, 2 check as to whether the address byte corresponds to the respective address thereof. If they do not mutually correspond, the data reception is interrupted until the next synchronizing sequence. When an address does correspond, the respective slave unit 1, 2 starts to process the data. The slave units 1, 2 have an identical list address defined by the hardware. Furthermore, an individual address may be assigned, via the data set, to each slave unit 1, 2.

For the respective initialization of and address allocation to a slave unit 1, 2, the master unit 6 transmits a command to open the previously closed switch 25, 26 by means of the list address. Thus, all of the slave units 1, 2 prevent the signal from being fed to the neighboring slave units 1, 2. Upon this command, the slave units 1, 2 do not transmit any reply in the direction of the master unit 6. In a further step, the master unit 6 transmits a first command to individually allocate addresses by means of the list address. Because the switches are open, only the first slave unit 1 directly connected to the master unit 6 receives the command. The digital computer 10 stores the address allocation and, via the summing element 29 and the output unit 13, supplies a defined reply to the master unit 6 that the individual address has been allocated. Furthermore, via the connection 27, the digital computer 10 causes the switch 25 to be closed.

The master unit 6 checks the defined reply and causes a re-initialization, if the reply is incorrect. If the reply is correct and if all of the slave units 1, 2 stored in the master unit 6 have not yet been initialized, a further command for individual address allocation by means of the list address is supplied, the command being received by the slave unit 2 which does not yet have an individual address. The initialization is repeated for the slave unit 2, as for the initialization of the first slave unit 1. The initialization is completed, if the individual addresses have been stored in all of the slave units 1, 2, and the slave units 1, 2 have successively transmitted a correct reply to the master unit 6.

Whenever, during data transfer to a slave unit 1, 2 by a master unit 6, an error has been determined which could not be eliminated after the commands have been repeated several times, the connection of the master unit 6 with the slave units 1, 2 has to be set up again.

Figure 2:
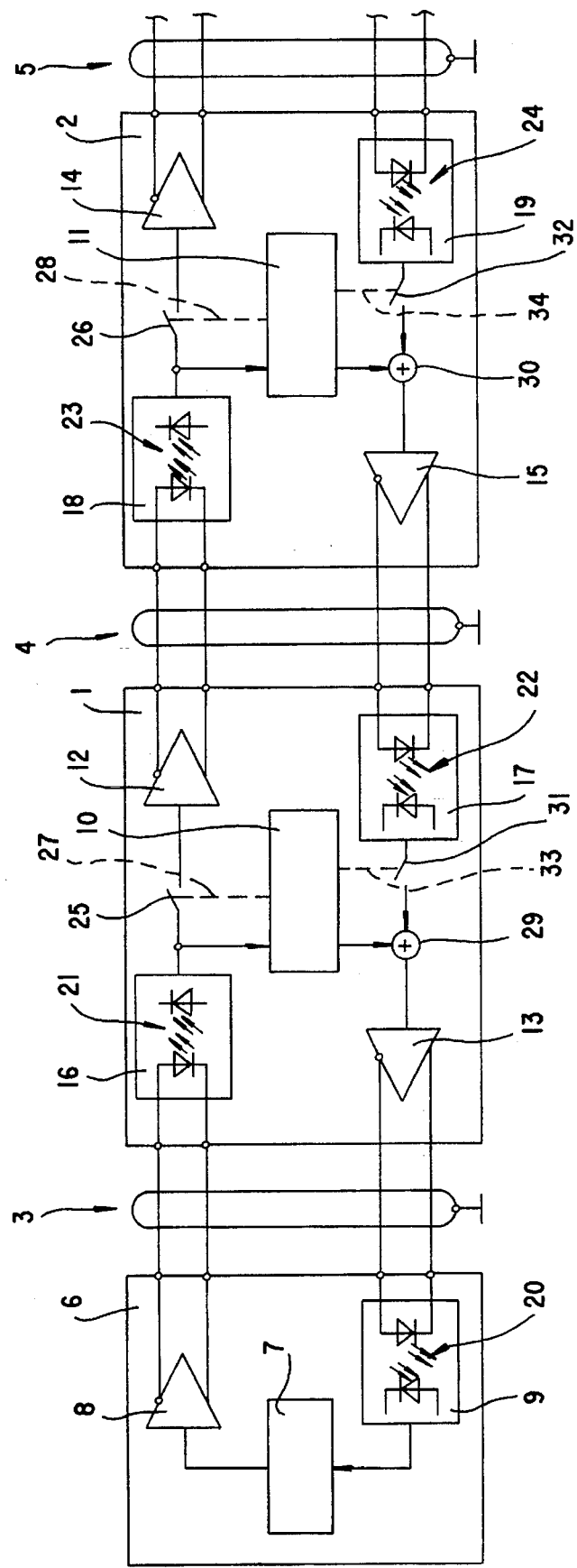
FIG. 2 is a circuit diagram of a second embodiment of the device for a slave unit.

According to the modified embodiment of the invention shown in FIG. 2, a respective additional electronic switch 31, 32 is provided between the second summing input of the respective summing elements 29, 30 and the respective input units 17, 19, and has a control input providing a respective connection 33, 34 to the respective digital computers 10, 11. Thus, interferences can be suppressed by a simultaneous transmission of signals by several slave units 1, 2. While the respective slave unit 1, 2 transmits signals itself, a reply of the respective slave unit 1, 2 which is transmitted in the direction of the master unit 6 could prevent the summing of signals in the summing elements 29, 30 of the slave units 1, 2 which are located more remote from the master unit 6. Thus, the respective slave unit 1, 2 closest to the master unit 6 has the highest priority.

Figure 3:
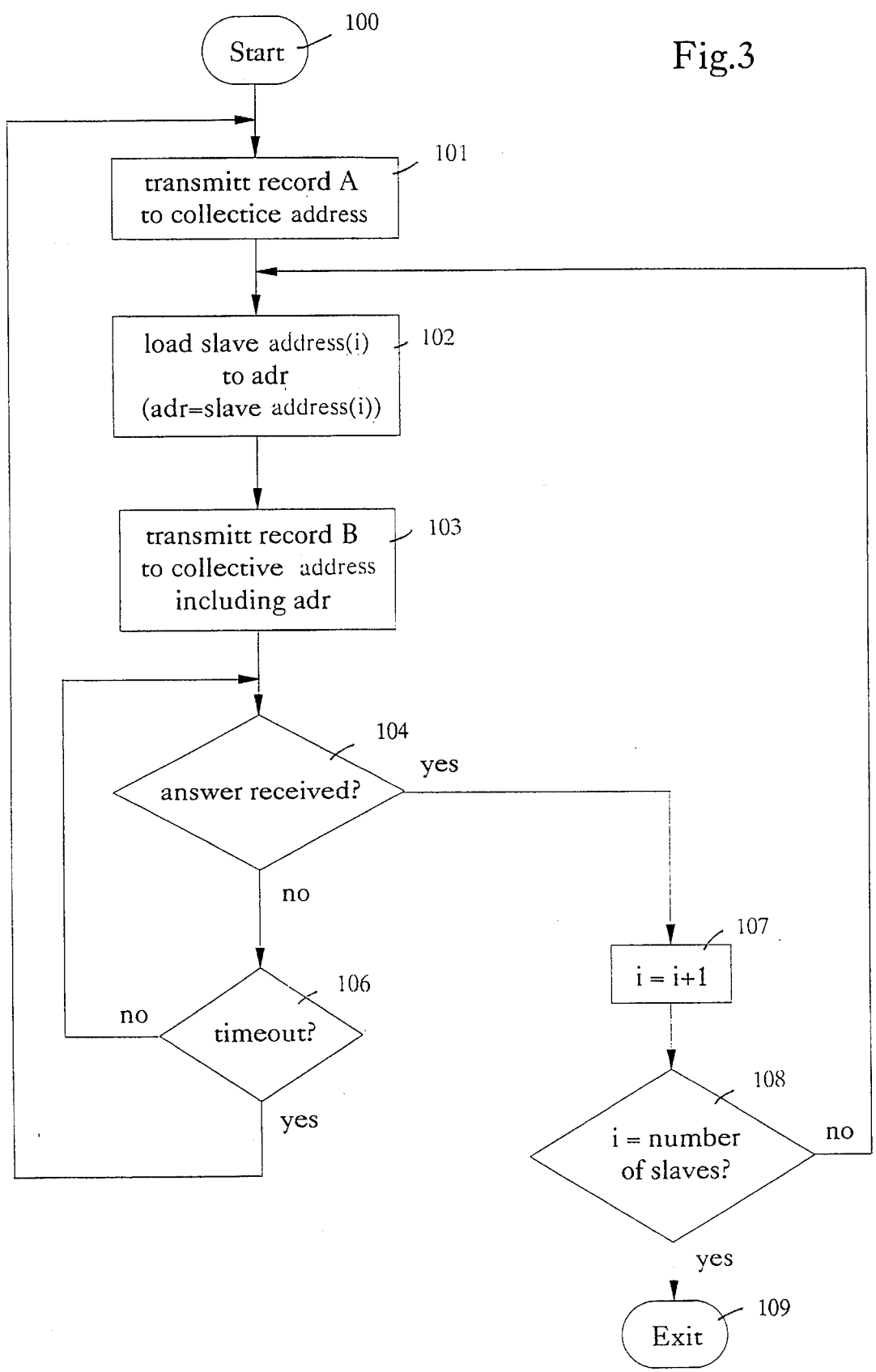
FIG. 3 is a flow chart illustrating the steps of assigning addresses for the slave units in accordance with the invention.

FIG. 3 is a flow chart showing the procedure for assigning individual addresses for slave units 1, 2 . . . i. After starting at 100, a common address, i.e., the list address, is transmitted at 101 to all of the slave units 1, 2 . . . i. At this time, all of the switches 27, 28. . . in the slave units 1, 2 . . . i are closed. Upon receipt of the list address, all of the switches 27, 28. . . are opened by the respective computers 10, 11 . . . . Next, at step 102, a first or next slave unit, i.e., the slave unit 1 or i, is to be initialized, i.e., assigned its individual address. Then, a record B is transmitted in step 103. This record includes the individual address to be assigned to the first or next slave unit 1 or i. In response to the record B, if the first or next slave unit 1 responds "yes" at 104, confirming that its assigned address has been received, it is followed by step 107 in which a counter "i" is incremented. If "i" is equal to the number of slave units in step 108, the initialization is completed at 109. If "i" is unequal to the number of slave units at 108, at which "no" is registered, the procedure is repeated from step 102 until all of the slave units have been initialized and assigned an address. If no answer is received in step 104 "no", after a time delay in step 106 "yes", the entire procedure is repeated from step 101.

Figure 4:
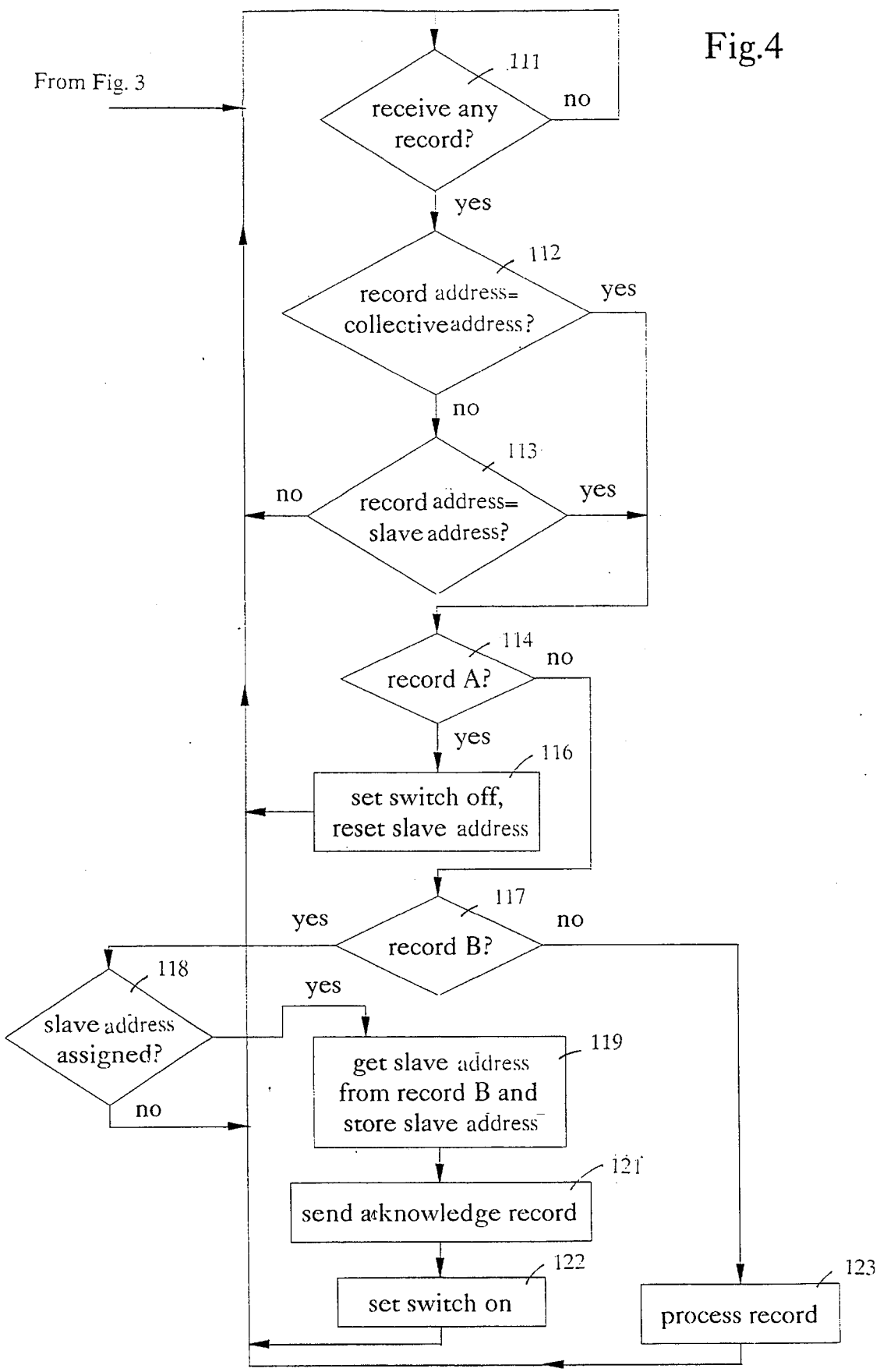
FIG. 4 is a flow chart illustrating further steps for preventing the assignment of addresses in the event of interference.

FIG. 4 is a flow chart showing the initialization procedure which is performed, if interference is caused by two or more of the slave units 1, 2 . . . i preventing the receipt of a proper response in the master unit 6. In this case, any slave units which respond operate the respective switches 31, 32 . . . of the embodiment of FIG. 2, which provides a priority for the lower numbered switch not affected by interference, as noted hereinbefore.

In FIG. 4, if any record from the procedure of FIG. 3 is received as determined in step 111 "yes", a test is performed in step 112 to determine if the received address is the collective address, i.e., the list address. If affirmative, a test is performed ion step 114 to determine if the record is record A. If affirmative, switch 33, 34 . . . in FIG. 2 is set to "off" and the slave address is reset and the procedure is terminated. If step 114 is negative, a test is performed in step 117 to determine if the received record contains record B. If affirmative in step 117, a test is performed in step 118 to determine if a slave address has been assigned. If affirmative in step 118, the assigned slave address is obtained in step 119 and stored, the record is acknowledged in step 121, and the respective switch 33, 34 . . . is set to "on" in step 122, terminating the procedure in FIG. 4.

If the test is negative in step 112, a test is performed in step 113 to determine if the record contains the slave address. If affirmative in step 113, the procedure continues in step 114 as described hereinbefore. If negative in step 113, the procedure is terminated. If the test performed in 114 has a negative result, the next step is step 117 as described hereinbefore. If the test in step 117 has a negative result, the process is recorded in step 123 and the procedure is terminated. If the test in step 118 proves negative, no slave address has been assigned and the procedure is terminated.

We claim:

1. Method of configuring functional units in a serial master-slave arrangement provided for bidirectionally transferring digital data between a master unit and respective slave units, wherein an allocation is made by the master unit of a respective address to each slave unit which, when in a non-configured condition, has no individual address, which comprises the steps of:

a) transmitting a record A from the master unit to a list address, the record A causing a switch to be opened in each of the slave units, an interruption of a transfer to the neighboring slave units, and a resetting of a memory for an individual address in each of the slave units;

b) transmitting another record B from the master unit to the list address, the record B allocating an individual address, which is determined by the master unit and included in the record B, to each of the receiving slave units, if the memory for the individual address remains in its reset condition in the slave unit;

c) upon allocation of the individual address to the respective slave unit, providing an acknowledgement of the allocation from the respective slave unit by transmitting therefrom an acknowledgement record to the master unit, and closing the switch;

d) upon receipt of the acknowledgement record by the master unit, transmitting from the master unit a further record with a further individual address to the list address;

e) repeating the foregoing steps b) through d) of the method until a respective individual address has been allocated to each of the slave units; and f) if an acknowledgement record transmitted in the foregoing step c) of the method has not been received by the master unit or has been received in faulty condition, repeating the foregoing steps a) through e) of the method until the acknowledgement signal sent by each of the slave units has been correctly received by the master unit.

2. Device for configuring functional units in a serial master-slave arrangement, including a master unit having a digital computer and an input/output unit, a plurality of slave units each having a digital computer and two input/output units, the master unit being connected to a first slave unit, and the slave units being connected to one another in series via the input/output units and data-transfer lines, comprising an electronic switch in each slave unit for blocking the transfer of data between a receiving section of the input/output unit for receiving information or signals from the direction of the master unit and a transmitting section of the input/output unit for driving information or signals in a direction towards adjacent slave units, and an electronic summing element in each of the slave units, the respective summing element having a first input connected to the respective digital computer, and a second input connected to a receiving section of the input/output unit for receiving the signals from a respective adjacent slave unit disposed more remotely from the master unit, and the respective summing element having an output connected to a transmitting section of the input/output unit connected in the direction towards the master unit.

3. Arrangement according to claim 2, including, connected between the respective summing element and the respective receiving section, a further electronic switch having a control input with a connection to the respective digital computer.

* * * * *